(12) United States Patent
Dallas et al.

(10) Patent No.: US 6,725,546 B1
(45) Date of Patent: Apr. 27, 2004

(54) HARDENED INSERT FOR CUTTING TOOLS

(75) Inventors: Edgar A. Dallas, Beaverton, OR (US); Peter B. Whitlock, West Linn, OR (US)

(73) Assignee: Alterra Holdings Corporation, Tigard, OR (US)

(*) Notice: Subject to any disclaimer, the term of this patent is extended or adjusted under 35 U.S.C. 154(b) by 381 days.

(21) Appl. No.: 09/368,781

(22) Filed: Aug. 5, 1999

(51) Int. Cl.⁷ ............................. B25B 7/22; B26B 17/00
(52) U.S. Cl. ................................. 30/193; 7/130; 7/133
(58) Field of Search ....................... 7/130, 132, 133; 30/349, 145, 193, 236

(56) References Cited

U.S. PATENT DOCUMENTS

| | | |
|---|---|---|
| 17,466 A | 6/1857 | Whitaker |
| 163,175 A * | 5/1875 | Foreman ............... 30/349 |
| 477,066 A * | 6/1892 | Root .................. 30/349 X |
| 512,461 A | 1/1894 | Walter |
| 651,082 A | 6/1900 | McClary |
| 871,476 A | 11/1907 | Chaney |
| 1,177,303 A | 3/1916 | Carski |
| 1,210,558 A | 1/1917 | Starrett |
| 1,276,256 A | 8/1918 | O'Reardon |
| 1,373,555 A * | 4/1921 | Graham ............... 30/349 X |
| 2,590,031 A * | 3/1952 | Peterson .............. 30/191 X |
| 3,487,524 A | 1/1970 | Filia |
| 4,080,733 A | 3/1978 | Clegg |
| 5,862,552 A | 1/1999 | Koelewyn ............. 7/133 X |

FOREIGN PATENT DOCUMENTS

| | | |
|---|---|---|
| DE | 255155 A1 | 12/1986 |
| DE | 19515955 A1 | 5/1995 |
| EP | 0396295 | 4/1990 |
| FR | 961413 | 2/1948 |
| FR | 2377864 | 10/1977 |
| FR | 2558089 | 1/1985 |
| GB | 738298 | 11/1952 |

\* cited by examiner

*Primary Examiner*—Douglas D. Watts
(74) *Attorney, Agent, or Firm*—Foley & Lardner LLP (57) ABSTRACT

A cutting tool having first and second lever arms with a cutting end and a handle end. A first insert and a second insert are connected to the cutting ends of each of the lever arms. The inserts are removable from the cutting ends of the lever arms, and each of the inserts include multiple cutting edges. When the inserts are connected to the cutting ends of the lever arms and the user pulls the handle ends towards each other, the cutting ends also move toward each other. As the cutting ends move toward each other, the inserts act cooperatively to sever materials located therebetween. When one of the cutting edges of an insert becomes dulled or damaged, the user removes the insert from the cutting end of the lever arm and repositions the insert on the cutting end such that a different cutting edge is revealed for severing materials.

21 Claims, 6 Drawing Sheets

HARDENED INSERT FOR CUTTING TOOLS

FIELD OF THE INVENTION

This invention relates generally to tools used for cutting various materials. More particularly, this invention relates to hand tools with multi-faceted inserts for cutting wire and other materials, wherein the inserts have multiple cutting edges so that when one cutting edge becomes dulled or otherwise damaged, the insert can be rotated in order to provide a new, sharp cutting edge.

BACKGROUND OF THE INVENTION

It is common for tools such as pliers to include sharp cutting edges for the purpose of cutting wires and other small objects. For example, a standard set of pliers may include one sharp edge on each of the two jaws. When the user desires to cut something such as a wire, the material would be placed between the sharp edges and the jaws would be closed. The sharp cutting edges would then come into contact with the material and sever it. Although these tools are very useful devices, there are several drawbacks to the standard arrangement on most tools. For instance, several types of pliers will form the cutting edges as one integrated piece with the rest of the jaws. Over the course of several months or years, the cutting edges will become rusted, dulled or otherwise damaged due to environmental conditions and excessive or improper use. For example, cutting edges can be deformed when a person attempts to cut an article made of a very strong or hard material. These actions will cause the effectiveness of the wire cutting portion of the tool to deteriorate over time. When the cutting edges are formed directly on the jaws, the only way to repair the cutting edges is to re-sharpen them. This can be very difficult and expensive given the small dimensions involved in a standard hand tool.

Several tools have been designed which avoid this problem by having cutting edges formed as part of an insert which is a separate piece. Each insert is then connected to each of the two jaws, either by a screw fastener or some other method. The advantage of this design is that when an insert edge becomes dulled or otherwise damaged, it can be removed and replaced with a new insert. Such inserts can be difficult to remove, however, if they are bent or otherwise deformed. Additionally, it can be difficult to find replacement inserts. If a person does not have these inserts on hand when a change is necessary, he would have to discontinue the operation until new inserts can be found. Finally, because tools such as pliers have such small openings in the jaws, removing old inserts and inserting new ones can be difficult.

Other tools have utilized inserts that comprise one or more single, circular cutting edges that can be rotated as a portion of the edge becomes dulled or damaged. These also have several drawbacks, however. First, the use of rounded cutting edges does not give the user a pair of flat cutting surfaces for severing materials. This can cause the object material to slip or shift during cutting. Second, if a portion of the round cutting edge becomes deformed, it is possible that the deformation will affect the orientation and position of the rest of the insert. If the deformation causes the insert to become misaligned, the ability of the tool to cut material becomes seriously compromised. Finally, rounded inserts can be difficult to remove and rotate.

SUMMARY OF THE INVENTION

It is, therefore, an object of the invention to provide an improved tool for cutting materials that includes inserts that are easily removed and inserted.

It is a further object of this invention to provide an improved insert for a cutting tool that allows the user to continue operating the device even after one edge of the insert has become damaged or dulled.

It is a further object of this invention to provide an improved insert for a cutting tool that is not easily damaged through their normal use or environmental conditions.

It is a further object of this invention to provide an improved removable and replaceable insert for a cutting tool that is strong enough to cut through hard materials.

It is a further object of this invention to provide an improved means for connecting an insert to a cutting tool such that the insert will not move or rotate relative to the tool when cutting a material.

These and other objects are attained in the present invention through the use of multi-faceted inserts made of hardened materials that can be easily removed and replaced and also are of a durable material that is not easily deformed.

DETAILED DESCRIPTION OF THE PREFERRED EMBODIMENTS

Figure 1:
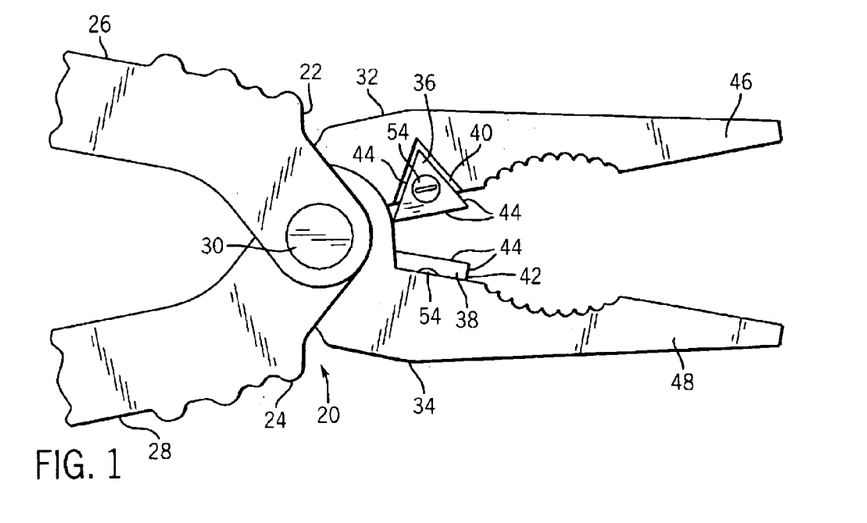
FIG. 1 is a side elevation view of a cutting tool in the open position with an insert attached.

A portion of a multi-tool 20 constructed in accordance with one embodiment of the invention is shown in FIG. 1. The multi-tool 20 comprises first lever arm 22 and second lever arm 24. Each of the lever arms 22 and 24 comprises handle ends 26 and 28, and cutting ends 32 and 34, respectively. The lever arms 22 and 24 are connected to each other at a pivot 30 which is preferably located between the handle ends 26 and 28 and the cutting ends 32 and 34. The pivot 30 can be assembled using a pin assembly or some other equivalent system. Such mechanisms are well known to those skilled in the relevant art.

As shown in FIG. 1, a first insert 36 and a second insert 38 are connected to the cutting ends 32 and 34 of each of the lever arms 22 and 24, respectively. In a most preferred embodiment of the invention, the inserts 36 and 38 are attached to the lever arms 22 and 24 such that the inserts 36 and 38 can cooperatively sever materials such as wire made from steel, copper and the like. In one preferred embodiment of the invention, the cutting ends 32 and 34 include first and second recesses 40 and 42 on each respective lever arm 22 and 24 for placement of the inserts 36 and 38. The first insert 36 is thus placed in the first recess 40 and the second insert 38 is placed in the second recess 42. At least one of the edges 44 of the first insert 36 is positioned so that it is capable of cutting material by working in conjunction with the second insert 38. In a preferred embodiment of the invention, a portion of the inserts 36 and 38 extends beyond the cutting end 32 and 34 into the space located between the two jaws 46 and 48 of the respective lever arms 22 and 24.

Each of the inserts 36 or 38 can be made of various materials. Materials such as a hardened tool steel or a carbide material can be especially useful to prevent the cutting edges 44 of inserts 36 and 38 from becoming dull, chipped or otherwise damaged.

Figure 8:
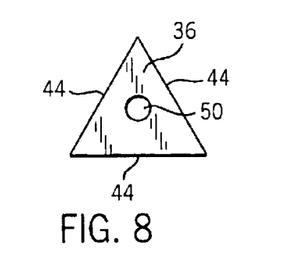
FIG. 8 is a top view of a three-sided insert.
Figure 9:
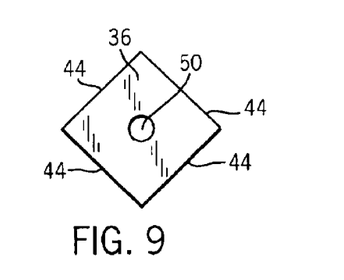
FIG. 9 is a top view of a four-sided insert in a quadrilateral shape.
Figure 10:
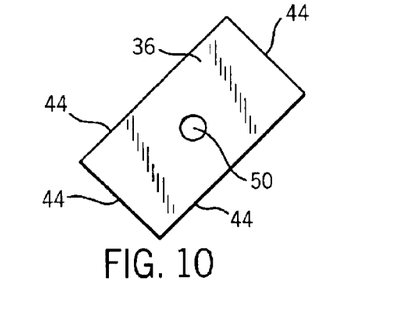
FIG. 10 is a top view of a four-sided rectangular-shaped insert wherein at least two of the cutting edges are of different lengths.
Figure 12:
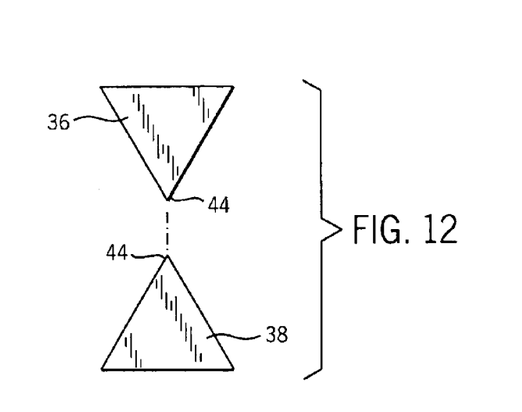
FIG. 12 is a front view of the interaction between aligned first and second inserts wherein two sides of the inserts taper to form a cutting edge.
Figure 13:
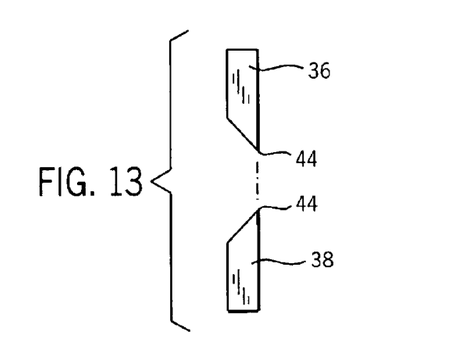
FIG. 13 is a front view of the interaction between aligned first and second inserts wherein one side of each insert tapers to form a cutting edge.
Figure 15:
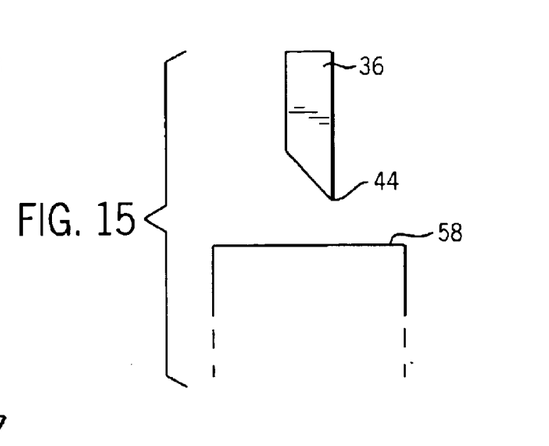
FIG. 15 is a front view of the interaction between a flat surface and an insert that has only one side taper to form the cutting edge.
Figure 16:
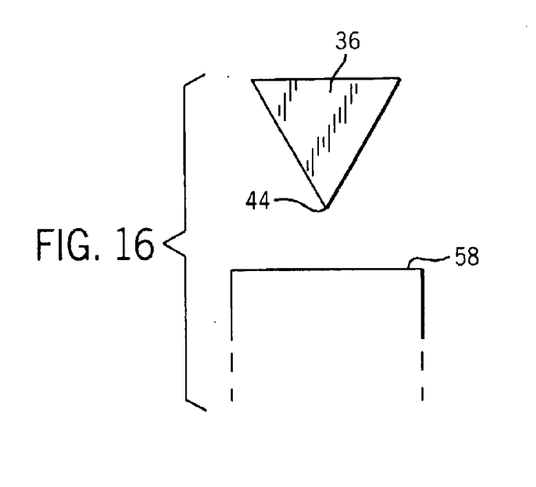
FIG. 16 is a front view of the interaction between a flat surface and an insert that has two sides taper to form the cutting edge.

The inserts 36 and 38 can also be of varying sizes and polygonal shapes. For example, in one preferred embodiment of the invention, as shown in FIG. 8, the inserts 36 and 38 have three of the cutting edges 44 of equal length forming an equilateral and equiangular polygon. It is also possible, however, to have the inserts 36 and 38 which include four, five or more of the cutting edges 44 and also to have the cutting edges 44 of varying lengths. It is also possible to have the inserts 36 and 38 wherein the angles between adjacent ones of the cutting edges 44 are of different sizes. Examples of different types of the inserts 36 and 38 are shown in FIGS. 9 and 10. Similarly, it is possible to form the cutting edges 44 in different manners. As shown in FIGS. 12 and 16, two sides of the inserts 36 and 38 can taper to form the cutting edge 44. It is also possible, however, to have only one side of the inserts 36 and 38 taper to form the cutting edge 44, as shown in FIGS. 13 and 15.

Figure 2:
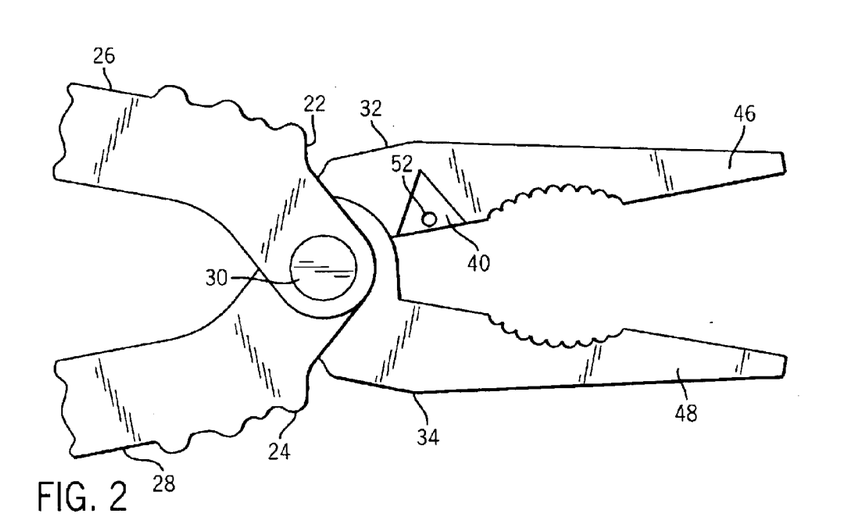
FIG. 2 is a side elevation view of a cutting tool in the open position without an insert in place.
Figure 5:
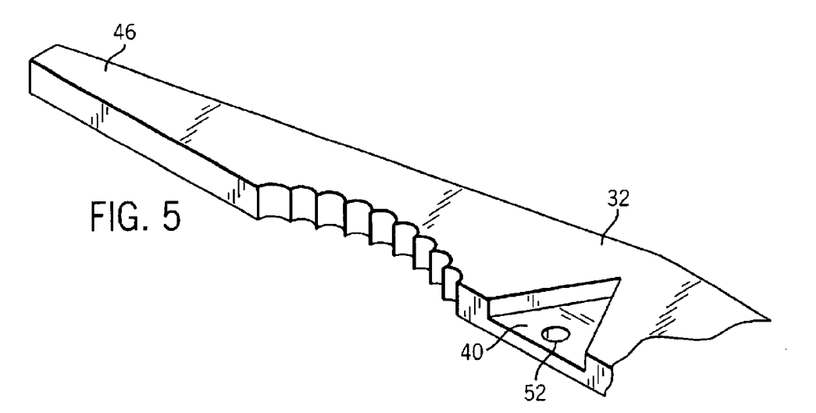
FIG. 5 is a side view of the cutting end of one of the lever arms with no insert in place.

Varying means can be used to connect or fasten the inserts 36 and 38 to the respective cutting ends 32 and 34 of the lever arm 22 and 24. In a preferred embodiment of the invention as shown in FIGS. 8–10, a first hole 50 is placed in the center of the first inserts 36. As shown in FIGS. 2 and 5, a second hole 52 is placed inside the recess 40 of the first cutting end 32. A screw 54 is placed into the holes 50 and 52, securing the first insert 36 in the recess 40 of the first cutting end 32. To remove the first insert 36 from the first cutting end 32, one would need to merely remove the screw 54 from the first insert 36. This action allows the first insert 36 to be rotated and placed into the recess 40, revealing a new one of the cutting edges 44 that is free of chips or abrasions. The same method can be used to connect the second insert 38 to the second cutting end 34 and to subsequently remove the second insert 38.

Figure 6:
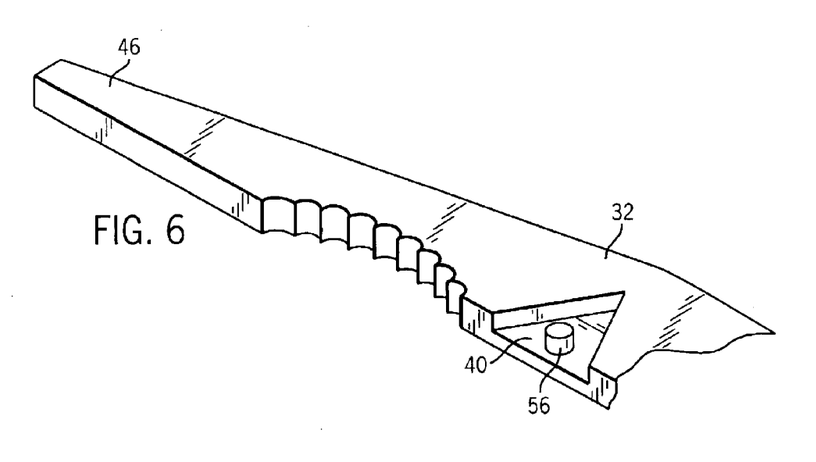
FIG. 6 is a side view of an alternate embodiment of a cutting end of a lever arm, where the cutting end includes an abutment which protrudes from the recess.
Figure 11:
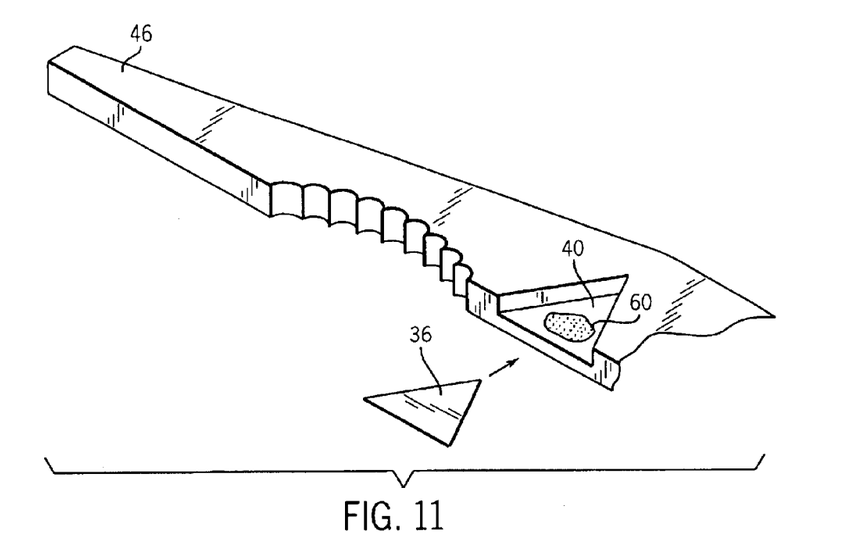
FIG. 11 is a side view of an alternate embodiment of a cutting end of a lever arm, where an insert is connected to the lever arm via an epoxy material or other similar substance.

In an alternate embodiment of the invention as shown in FIG. 6, the cutting ends 32 and 34 could include an abutment 56 upon which the insert 36 and 38 could be snap-fitted, allowing for easy removal and placement of the inserts 36 and 38. In yet another embodiment of the invention as shown in FIG. 11, an epoxy material 60 could be used to bond the inserts 36 and 38 into the recesses 40 and 42 of the cutting end 32 and 34. A solvent or other conventional means could then be used to remove the inserts 36 and 38 from the recesses 40 and 42 of the cutting ends 32 and 34 whenever one of the edges 44 became chipped or dulled in some way. In still another embodiment of the invention, the inserts 36 and 38 are made of a magnetic material. The area in the vicinity of the recesses 40 and 42 are comprised of a material such that the inserts 36 and 38 are magnetically attracted to the cutting ends 32 and 34. Such material combinations are well known to those skilled in the art.

Figure 3:
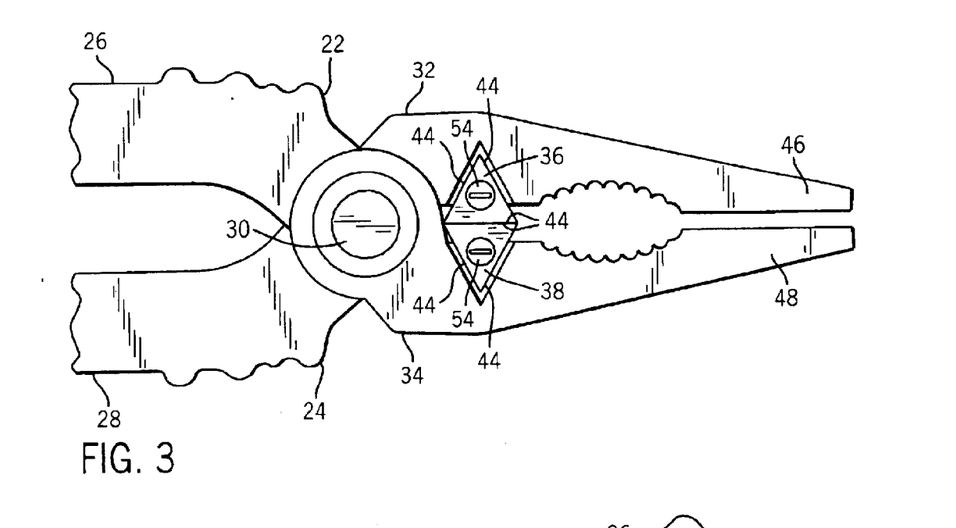
FIG. 3 is a side elevation view of an embodiment of the invention where two inserts come into contact with each other when the tool is in the closed position.

When the inserts are in place, the tool preferably performs as follows: The user grips the handle ends 26 and 28 of the lever arms 22 and 24 and pulls the handle ends 26 and 28 towards each other. This action causes the cutting ends 32 and 34 of the levers arms 22 and 24 to also move towards each other in a reciprocal fashion. This action also brings the corresponding inserts 36 and 38 closer towards each other. If the inserts 36 and 38 are in the same vertical plane as shown in FIGS. 3 and 12, then as the angle between the two cutting ends 32 and 34 approaches zero, one of the cutting edges 44 of first insert 36 will come into contact with one of the cutting edges 44 of the other insert 38.

Figure 14:
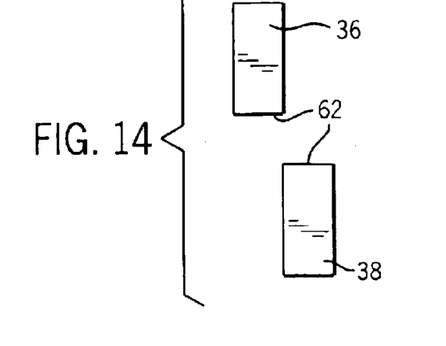
FIG. 14 is a front view of the interaction between horizontally offset first and second inserts where each insert has a flat surface.
Figure 17:
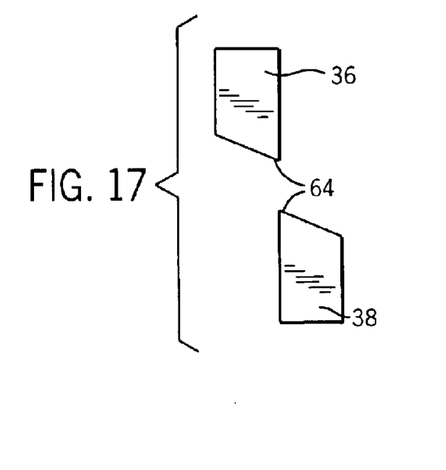
FIG. 17 is a front view of the interaction between horizontally offset first and second inserts where one side of each insert is tapered.

In an alternate embodiment of the invention as shown in FIG. 14, the inserts 36 and 38 are not located in the same vertical plane, but instead are offset horizontally by a small distance. When the user moves the handle ends 26 and 28 of the lever arms 22 and 24 towards each other, the cutting ends 32 and 34 also move towards each other. In one embodiment, the first and second inserts 36 and 38 each have a flat cutting edge 62 to prevent an improper jamming of the inserts 36 and 38. The flat cutting edge 62 of the first insert 36 then bypasses the flat cutting edge 62 of the second insert 38. This will cause a shearing of the material instead of a sharp cut. In an alternate embodiment as shown in FIG. 17, the first and second inserts 36 and 38 can each have a single sharpened edge 64 to provide a mixture of cutting and shearing. In both embodiments, however, the end result is that the two inserts 36 and 38 act cooperatively to cut material that is disposed therebetween.

Figure 4:
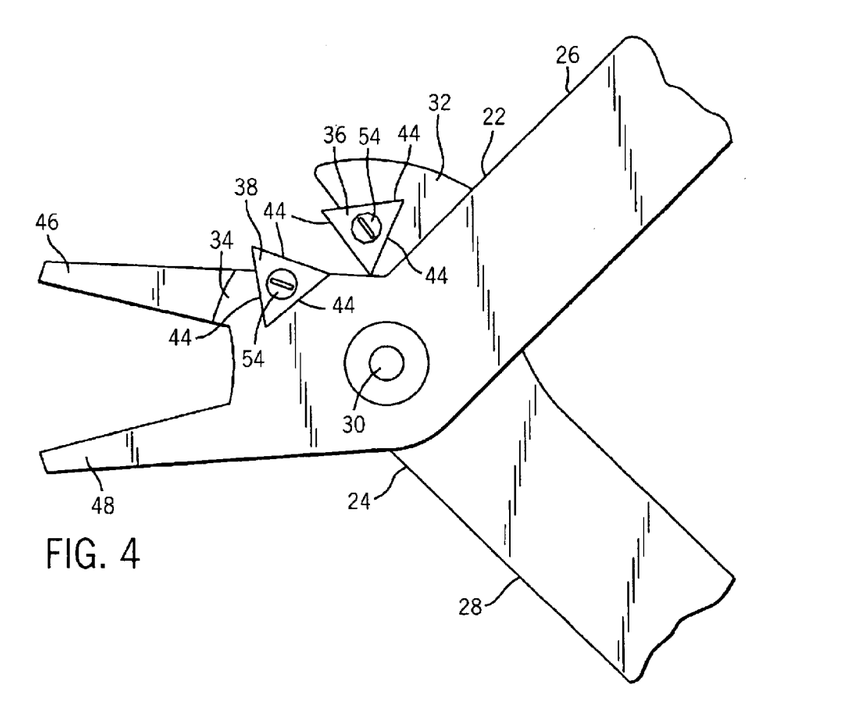
FIG. 4 is a side elevation view of an alternate embodiment of the invention where two inserts form a pair of side cutters on a tool.

In an alternate embodiment as shown in FIG. 4, the inserts 36 and 38 are not located so as to cut material placed between the jaws 46 and 48. Instead, the inserts 36 and 38 work as a pair of side cutters on the cutting ends 32 and 34. Although the material to be cut is placed in a different location, the tool functions in substantially the same manner as the other embodiments of the invention. Material is placed between the cutting ends 32 and 34 of the lever arms 22 and 24. When the user moves the lever arms 22 and 24 towards each other, the cutting edges 44 on the cutting ends 32 and 34 move towards each other, working cooperatively to sever the material.

Figure 7:
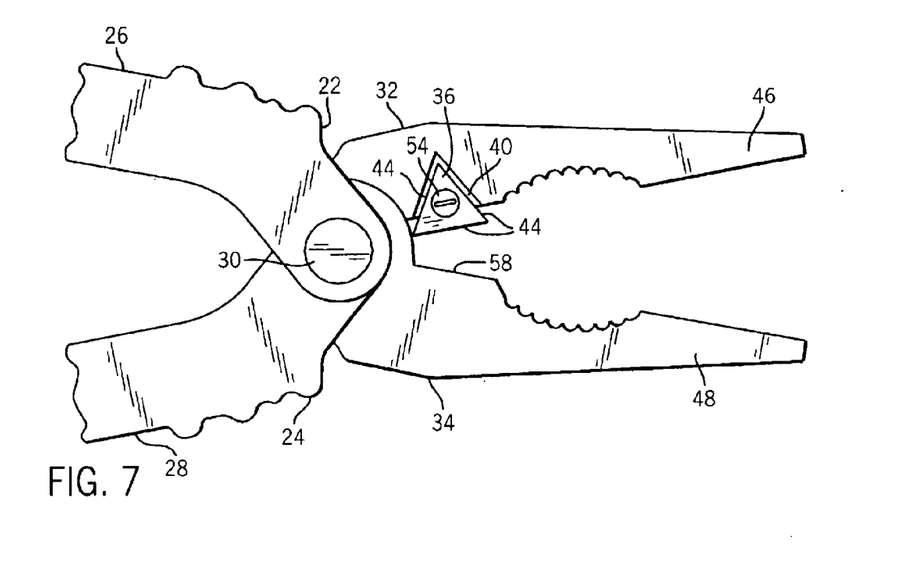
FIG. 7 is a side elevation view of an alternate embodiment of the invention, where one insert works in cooperation with a hard and flat surface.

In other embodiments of the invention as shown in FIGS. 7, 15, and 16, only one of the inserts 36 would be needed to adequately cut materials. In these embodiments the first cutting end 32 would include the insert arrangement previously described. The second cutting end 34, however, would include a flat surface 58 that is generally perpendicular to the cutting edge 44 on the insert 36. When the two cutting ends 32 and 34 move towards each other, the cutting edge 44 of the insert 36 would come into contact with the flat surface 58, severing the material.

While several preferred embodiments have been shown and described it is understood that changes and modifications can be made to the invention without departing from the invention's broader aspects. For example, inserts could be made of many different materials and be configured to have different shapes and sizes. Additionally, there are many different methods known in the art for connecting the inserts 36 and 38 to the lever arms 22 and 24 while still being able to remove the inserts 36 and 38 when appropriate. Also it is possible to have fewer than all of the sides of the inserts 36 and 38 to include cutting edges for severing materials. Thus, it is apparent that alternate embodiments are available to those skilled in the relevant art.

What is claimed is:

1. A tool for cutting materials, comprising:
   a first lever arm;
   a second lever arm, said second lever arm being coupled to said first lever arm by a pivot assembly;
   a first insert with multiple cutting edges including at least a first cutting edge and a second cutting edge, said first cutting edge being of greater length than said second cutting edge, said first insert disposed at least partly within and attached to said first lever arm; and
   a second insert with multiple cutting edges including at least a third cutting edge and a fourth cutting edge, said third cutting edge being of greater length than said fourth cutting edge, said second insert disposed at least partly within and attached to said second lever arm such that when the angle between said first lever arm and said second lever arm is reduced towards zero, said first insert and said second insert cooperatively act to cut material disposed therebetween.

2. The tool according to claim 1 wherein one cutting edge of said first insert and one cutting edge of said second insert come into contact with each other when the angle between said first lever arm and said second lever arm is reduced to zero and there is no foreign object between said first lever arm and said second lever arm.

3. The tool according to claim 1 wherein one cutting edge of said first insert and one cutting edge of said second insert bypass each other when the angle between said first lever arm and said second lever arm is reduced to zero and there is no foreign object between said first lever arm and said second lever arm.

4. The tool according to claim 1 wherein said inserts are made at least partly of a carbide material.

5. The tool according to claim 1 wherein said inserts are made at least partly of a hardened tool steel.

6. The tool according to claim 1 wherein each of said inserts includes at least two cutting edges.

7. The tool according to claim 6 wherein each of said inserts includes at least four cutting edges.

8. The tool according to claim 1 wherein each of said inserts comprises a polygon of at least three sides.

9. The tool according to claim 1 wherein said first insert comprises a polygon having at least two hardened edges.

10. The tool according to claim 1, further comprising means for connecting said inserts to said lever arms.

11. A wire cutter, comprising:
    a first lever arm having a handle end and a cutting end;
    a second lever arm having a handle end and a cutting end;
    a pivot assembly for connecting said first lever arm to said second lever arm, said pivot assembly being located between the handle end and the cutting end of said first lever arm and said second lever arm;
    a first insert with multiple cutting edges;
    a second insert with multiple cutting edges; and
    means for non-threadedly connecting said first insert to said first lever arm and said second insert to said second lever arm.

12. A wire cutter according to claim 11 wherein each of said lever arms includes a recess for receiving said inserts.

13. A wire cutter according to claim 11 wherein said means for non-threadedly connecting said inserts to said lever arms comprises an epoxy material which bonds said inserts to said lever arms.

14. A wire cutter according to claim 11 wherein said means for non-threadedly connecting said inserts to said lever arms comprises an abutment on each of said lever arms upon which said inserts can be clipped.

15. A wire cutter according to claim 11 wherein said means for non-threadedly connecting said inserts to said lever arms comprises said inserts being comprised at least partially of a magnetic material and at least a portion of said cutting ends being made of a material such that said inserts and said cutting ends are magnetically attracted to one another.

16. A wire cutter according to claim 11 wherein each of said inserts comprise a carbide material.

17. A wire cutter according to claim 11 wherein each of said inserts comprise a hardened tool steel.

18. A wire cutter according to claim 11, wherein each of said inserts include at least three cutting edges.

19. A wire cutter according to claim 11, wherein the cutting edges on each of said inserts are of varying lengths.

20. The tool according to claim 11 wherein one cutting edge of said first insert and one cutting edge of said second insert bypass each other when the angle between said first lever arm and said second lever arm is reduced to zero and there is no foreign object between said first lever arm and said second lever arm.

21. The tool according to claim 11 wherein one cutting edge of said first insert and one cutting edge of said second insert come into contact with each other when the angle between said first lever arm and said second lever arm is reduced to zero and there is no foreign object between said first lever arm and said second ever arm.

* * * * *

UNITED STATES PATENT AND TRADEMARK OFFICE
CERTIFICATE OF CORRECTION

PATENT NO. : 6,725,546 B1
DATED : April 27, 2004
INVENTOR(S) : Edgar A. Dallas and Peter B. Whitlock It is certified that error appears in the above-identified patent and that said Letters Patent is hereby corrected as shown below:

Column 4,
Line 15, "end" is changed to -- ends --.

Signed and Sealed this

Nineteenth Day of October, 2004

JON W. DUDAS
*Director of the United States Patent and Trademark Office*